(12) United States Patent
Shabat et al.

(10) Patent No.: US 10,176,727 B2
(45) Date of Patent: Jan. 8, 2019

(54) MEDICAL SIMULATION SYSTEM

(71) Applicant: SIMBIONIX LTD.

(72) Inventors: Matan Shabat, Eilat (IL); Niv Fisher, Ramat Gan (IL); Hadar Segal, Bat-Yam (IL)

(73) Assignee: SIMBIONIX LTD., Airport City (IL)

(*) Notice: Subject to any disclaimer, the term of this patent is extended or adjusted under 35 U.S.C. 154(b) by 811 days.

(21) Appl. No.: 13/898,483

(22) Filed: May 21, 2013

(65) Prior Publication Data

US 2014/0349264 A1   Nov. 27, 2014

(51) Int. Cl.
*G09B 23/28* (2006.01)
*G09B 23/30* (2006.01)
*G06F 19/00* (2018.01)

(52) U.S. Cl.
CPC ............ *G09B 23/28* (2013.01); *G06F 19/00* (2013.01); *G09B 23/285* (2013.01); *G09B 23/30* (2013.01)

(58) Field of Classification Search
USPC ...................................................... 434/267
See application file for complete search history.

(56) References Cited

U.S. PATENT DOCUMENTS

| | | | | |
|---|---|---|---|---|
| 6,038,488 | A * | 3/2000 | Barnes ................... | G09B 23/28 128/920 |
| 6,106,301 | A * | 8/2000 | Merril ................... | G09B 23/285 434/262 |
| 2006/0194180 | A1 | 8/2006 | Bevirt et al. | |
| 2007/0134637 | A1 | 6/2007 | Bronstein et al. | |
| 2007/0273872 | A1 * | 11/2007 | Vecerina ........... | A61B 17/00234 356/153 |
| 2008/0126041 | A1 * | 5/2008 | Maspoli ................. | G09B 23/28 703/7 |
| 2010/0021875 | A1 | 1/2010 | Hendrickson et al. | |
| 2010/0041005 | A1 | 2/2010 | Campbell et al. | |
| 2014/0272873 | A1 | 9/2014 | Svensson et al. | |

FOREIGN PATENT DOCUMENTS

RU           114208           3/2012

OTHER PUBLICATIONS

United States Patent and Trademark Office, Office Action issued for U.S. Appl. No. 13/952,681 dated Sep. 7, 2016.
Final Office Action Issued from the United States Patent and Trademark Office dated Mar. 22, 2017 for U.S. Appl. No. 13/952,681.
Office Action Issued from the United States Patent and Trademark Office dated Aug. 2, 2017 for U.S. Appl. No. 13/952,681.
Office Action issued by the United States Patent and Trademark Office for U.S. Appl. No. 13/952,681 dated Jan. 31, 2018.

\* cited by examiner

*Primary Examiner* — James Hull
(74) *Attorney, Agent, or Firm* — Pearl Cohen Zedek Latzer Baratz LLP

(57) ABSTRACT

A system for simulating an image-guided medical procedure on a computerized anatomy is provided. The system includes a foldable base having two portions connected by a hinged connector, each portion of the foldable base is provided with one or more docking stations. The system further includes two or more working units, each connectable to any one of the docking stations. Each working unit comprises a chamber capable of receiving an operation tool, a diameter sensor to detect diameter information related to the operational tool and a tracking unit configured to detect tracking information related to the operational tool.

9 Claims, 7 Drawing Sheets

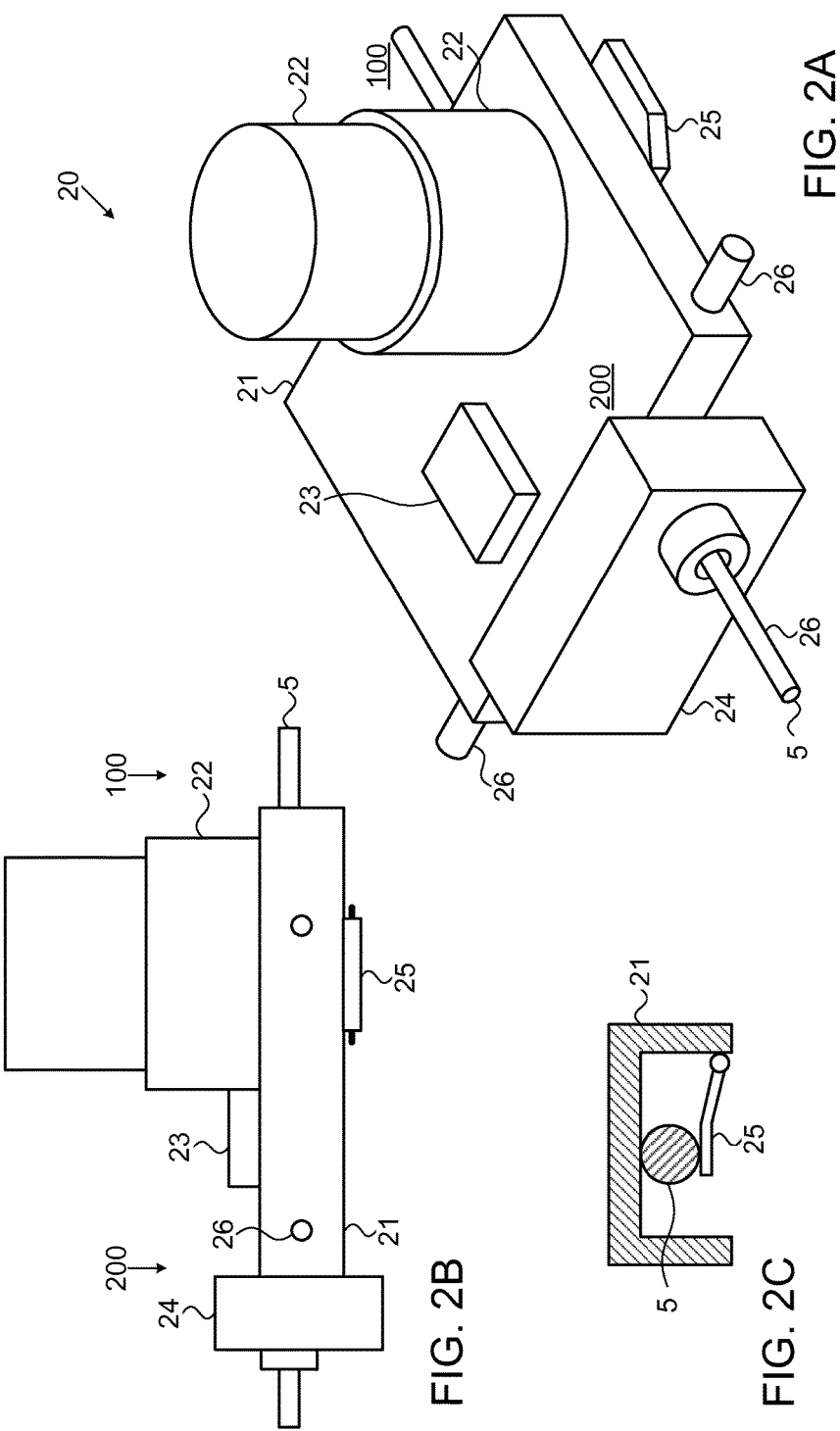

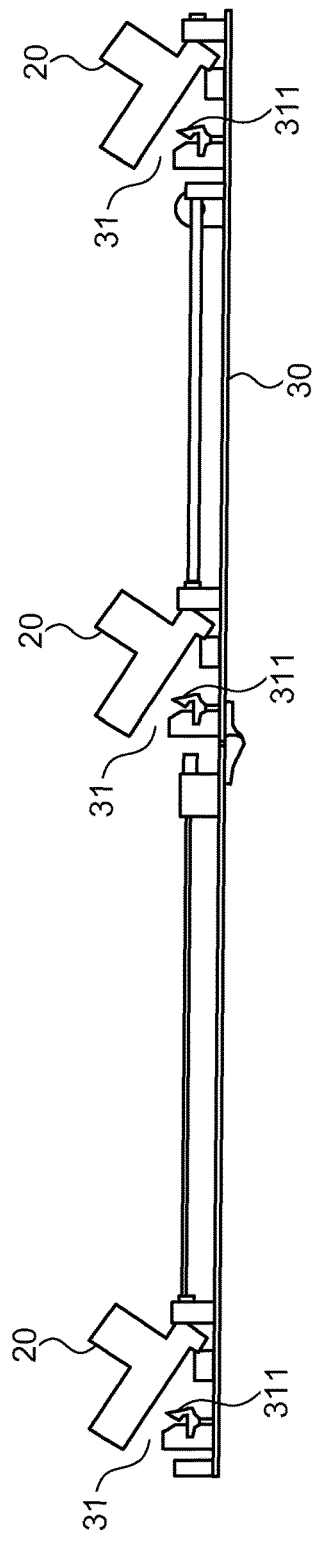

MEDICAL SIMULATION SYSTEM

BACKGROUND OF THE INVENTION

Many medical procedures such as, for example, angioplasty procedures can pose challenges even to the most experienced physicians. When performing angioplasty procedures such as angioplasty balloon procedure to eliminate blockages in a blood vessel, a physician may insert and manipulate several operational tools, for example, guidewires, catheters and sheaths into a patient's arterial network, until reaching the blockage point. During the navigation in the patient's arterial network, the physician may inject a contrasting fluid into the arterial network to allow a visual inspection of the location of the tools in the arterial network on a display (e.g., a fluoroscope display under continuous X-ray radiation). The operational tool(s) include a guidewire coaxially located inside the catheter, which in turn is coaxially located inside the sheath. Upon reaching the blockage point the catheter is replaced with an angioplasty catheter that comprises a balloon, to be inflated and open the blockage. A stent is then placed in the blockage area and the balloon is removed.

Medical procedures, such as an angioplasty balloon procedure, that involve delicate and coordinated hand movements, spatially unrelated to the view on a video monitor of the remotely controlled operational tools may pose a number of challenges. Depth perception is lacking on a flat video display and therefore it is not an easy task to learn to control the tools through the spatially arbitrary linkage. A mistake in this difficult environment can be dangerous. Therefore, a high level of skill is required, and a realistic training of these specialists is a complex task. For example, a trainer or instructor may guide a trainee to manipulate the operational tools inside the arterial network of a patient possibly suffering from a heart disease or a patient that undergoes a heart attack.

Image-guided procedures, such as vascular catheterization, angioplasty, and stent placement, are specially suited for simulation because they typically place the physician at-a-distance from the operative site manipulating operational tools and viewing the procedures on video monitors. Several systems have been developed to train physicians in angioplasty procedures. The systems simulate the actual tactile sensation that the user feels when the arterial network applies force on each tool and display to the user a simulated image (e.g., a fluoroscopic image) of the operational tool inside the arterial network.

The length of the operational tools used in endovascular procedures requires that the simulator shall be long, making the current simulation systems long, heavy and less portable, for example, for presentations or training sessions at different medical institutions or even at different department within the same medical institution. Additionally, the maintenance of such systems is complicated. For example, each time a failure is detected in one of the systems components (e.g., in a sensor) the entire system must be shipped back to the manufacturer. Since different components are used to sense and control the different operational tools, (e.g., each system has three different sensors) those sensors must be replaced and calibrated by the manufacturer.

Complicated simulations systems that comprise one or more sensors may lose calibration due to moving the system or through constant interaction with tools and may require re-calibration by an expert technician in order to render the simulator operational. The need to simulate various advancement channels of the tools to match the manner endovascular procedures are performed, with multiple entry points of tools into the body, further requires that simulators will have multiple channels that may also be joined at their distal end.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2A and 2B are illustrations of an exemplary removable working unit according to some embodiments of the invention;

FIG. 2C is an illustration of an exemplary operational tool inside a tool chamber according to some embodiments of the invention;

FIG. 4 is a detailed illustration of an assembly of working units in a base according to some embodiments of the invention;

Figure 1:
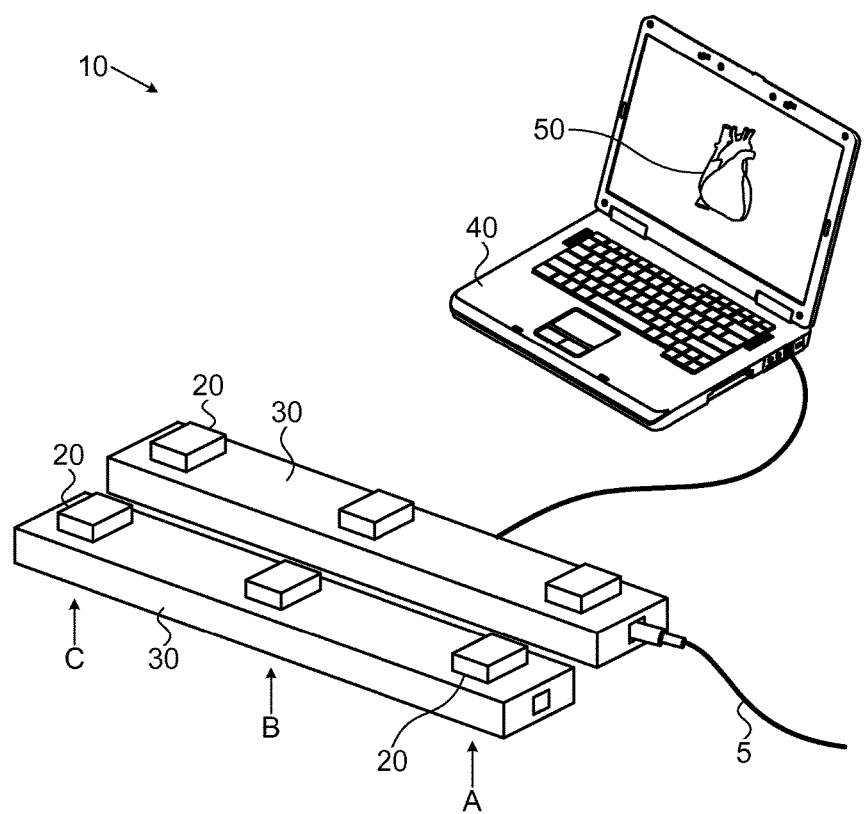
FIG. 1 is an illustration of an exemplary foldable system for simulating an image-guided medical procedure according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Some embodiments of the invention are related to a portable medical simulation system for simulating image-guided medical procedures on a computerized anatomy, for example, angioplasty procedures. The system may include two main components: a computer that executes simulation software and a user manipulation system that enables a user (e.g., a physician or a trainer) to physically manipulate operational tools. The user may select a type of medical procedure and/or a type of operational tool, using a user interface included in the computer, and the computer may control various components included in the user manipulation system, such that during manipulation of the operational tool the user may get the tactile feeling that an actual force is applied to the operational tool simulating the force that would have been applied to the tool according to the selected type of medical procedure. The simulation software may include a computerized anatomy simulating the organ in which the medical procedure is to be performed, for example, an artery network and the computer may display to the user a simulated image of the computerized anatomy that mimics a realistic image of the organ as would have been appeared on a real display during a real medical procedure. For example, a fluoroscopic image of the artery network.

In some embodiments, a system according to the invention may be packed into a conventional suitcase having, for example, dimensions of around 56 cm×36 cm×23 cm, and may be hand carried by a passenger into an airplane. Several components may be easily disassembled from the user manipulation system and the system may be folded. The reassembly of the simulation system may be done by a single person, where each element is the system may be assembled using a "plug and play" mechanism, for example, using a single or double action. The user manipulation system may include a foldable base that may be folded and packed into a suitcase. The user manipulation system may further include various components configured to track the movements of various operational tools and apply force to one or more of the tools. A set of components configured to track the movements and apply force to a single tool, may be assembled together in a single working unit. Two or more working units, assembled in the user manipulation system may be substantially identical to each other, thus any working unit may be assembled at any position in the base. Upon docking into the base each component in the working unit may be located at the right position and automatically calibrated to track the movements and apply force to different tools. The working units may be removable (for easy assembly or disassembly from the base).

In some embodiments, the system may include a foldable base (included in the user manipulation system) and one or more removable working units, each configured to track movements and apply force to a different tool. The working units may be substantially identical. The working units, according to some embodiments of the invention, may be assembled in any medical simulation system In some embodiments, the system may include a foldable base and each of the components configured to track the movements and apply force to the tools, may be assembled directly to the base. Such system does not include removable working units.

In some embodiments, the system the may include a non-foldable base and one or more removable working units, each for tracking movements and applying force to a different tool. The working units may be substantially identical.

Reference is made to FIG. 1, which shows an exemplary system for simulating an image-guided medical procedure according to some embodiments of the invention. As shown, a system 10 may include two or more removable working units 20 assembled and docked into one or more foldable bases 30. A tool 5, to be manipulated by a user, may be inserted into a hole in base 30. Tool 5 may include two or more coaxial tools inserted one into the other. The system may be controlled by controller 40 that may control the various components included in each of working units 20 to track the movement of operational tool 5 and apply force to the tool, based on a simulation program selected by the user. In some embodiments, the system may further include a simulated injection system (not illustrated) for simulating for example an injection of a contrasting fluid. In some embodiments controller 40 may be integrated into base 30.

Tool 5 may include two or more coaxial tools inserted one into the other, as illustrated in FIG. 1. For example, tool 5 may include a sheath comprising a catheter (such as a balloon catheter). In yet another example, tool 5 may include a guidewire inserted into a catheter. In some embodiments, the catheter comprising the guidewire may further be inserted into a sheath, forming a three coaxial tool arrangement. In some embodiments, tool 5 may include a single tool, for example a balloon catheter.

In the exemplary system illustrated in FIG. 1, three working units 20 are assembled to each one of the two foldable bases 30. Working unit 20 assembled at position A may apply force and track the movement of a sheath having a diameter of approximately 2-5 mm, working unit 20 assembled at position B may apply force and track the movement of a catheter having a diameter of approximately 0.5 mm and working unit 20 assembled at position C may apply force and track the movement of a guidewire having a diameter of 0.1 mm. All working units 20 may be substantially identical and configured to manipulate any operational tool having any diameter.

Controller 40 may be configured to control the image-guided medical procedure by tracking the movement of the tool (i.e., tracking information) following the tools manipulation by a user, applying force to the tool that simulates the force that an organ would have been applied on the tool and presenting to the user a simulation of a realistic image of (e.g., a fluoroscopic image) of a patient's organ (e.g., arterial network) and the location of each operational tool in the simulation.

In some embodiments, system 10 may further include one or more syringes and feet pedal (not illustrated) for simulating a realistic medical procedure. During a real medical procedure, in order for the physician to receive an image, such as X-ray image, of the operational tool inside the organ, the physician must inject contrasting fluid into the patient's blood system using a syringe and must further activate an X-ray machine, using a feet pedal. System 10 may include a first syringe to enable realistic simulation of injecting contrasting fluids to a patient and feet pedal for uploading a realistic image of the simulated operational tool inside the computerized anatomy. The first syringe may include a gauge and the feet pedal may include a switch, both pedal and syringe may be in communication with controller 40, such that when a user may press the first syringe and step on the pedal a simulated fluoroscopic image (or other image) may be displayed on a display 50. In some embodiments, system 10 may include a second syringe for simulating an inflation of a balloon in a simulated angioplasty stent deployment. The second syringe may include a gage and may be in communication with controller 40, such that when a user may press the second syringe the simulation software displays a simulated image of an inflated balloon on display 50 and the a stent deployment procedure may be simulated using all the elements included in system 10.

Controller 40 may include a user interface that may allow the user to select various parameters related to the simulation. For example, a type of operation to be preformed (e.g., opening a blockage in a certain location in the blood vessel), the type of tool to use (e.g., a guidewire, a balloon catheter, a stent delivery catheter, etc), the graphical display (e.g., a fluoroscopic display, a three dimensional simulation of the computerized anatomy, etc.,) that may be displayed on display 50 or any other parameter available for the user. At the end of the simulated operation, the controller may further determine a performance score based on the user performance and display the score on display 50. Controller 40 may be or may include a general purpose computer such as a personal or laptop computer, a tablet computer, or any other type of computing platform that may be provisioned with a memory device, a Central Processing Unit (CPU) or microprocessor device, and several input/output (I/O) ports.

Reference is made to FIGS. 2A-2B, which show isometric and front views of an exemplary removable working unit according to some embodiments of the invention. A working unit 20 may include a tool chamber 21 to hold an operational tool, such as any one of the coaxial tools included in tool 5, a force feedback unit 22 that may apply, cause or generate physical force or resistance to the operational tool, a tracking unit 23 configured to detect tracking information related to the operational tool (i.e., track translational and rotational movements of the operational tool) and a diameter sensor 24 to detect diameter information related to the operational tool (i.e., the diameter of the operational tool). The working unit may be operable with a number of tools included in tool 5 having different diameters (as opposed to conventional working units that are limited to a specific diameter), accordingly, all of the working units of the system of FIG. 1 may be substantially identical and may be used with different operational tools having different diameters (e.g., sheaths, catheters or guidewires). Working unit 20 may further include a lever 25 to move the operational tool towards an internal surface (e.g., an upper surface) of tool chamber 21 (FIG. 2C). One or more docking components 26 may be included in working unit 20 to dock the working unit to a docking station in base 30.

Tool chamber 21 may include an entrance 100 and an exit 200 for any coaxial tool included in tool 5. The entrance and the exit may be adapted to support any tool diameter. Force feedback unit 22 may be attached to chamber 21 such that force generated by force feedback unit 22 may be applied to a portion of the operational tool located in chamber 21, when the operational tool is manipulated by a user. Force feedback unit 22 may be controlled to apply a force that simulates the force that may be applied to any tool 5 by a particular human organ (e.g., a blood vessel), according a simulation procedure selected by the user using the user interface included in controller 40. For example, controller 40 may control force feedback unit 22 to apply force, to a portion of a catheter located inside chamber 21 in unit 20, that simulates the force that may be applied to the catheter upon hitting the walls of the left coronary artery. Force feedback unit 22 may include any motor, for example, a voice coil, a servo motor, a solenoid, a step motor, etc., for applying force in response to a feedback.

Tracking information, for example, translational and rotational movements of any operational tool inside chamber 21 may be detected by tracking unit 23. Tracking unit 23 may be an optical unit configured to track the translational and rotational movements of a longitudinal object (e.g., an operational tool). For example, optical tracking unit 23 may include a light source and a screen for acquiring pictures of the tools pattern when the tool is manipulated by the user and processing the pattern change in time. Optical tracking unit 23 may utilize the same methods and components used in an optical mouse. The detected translational and rotational movements of the tool tracked by optical tracking unit 23 may be forwarded to controller 40 that may further determine the amount of force to be applied to the tool by force feedback unit 22, based on the received movements. For example, if the movement of the tool indicates that the tool has been manipulated to leave the coronary artery and enter a narrower artery, the amount of force that should be applied to the tool may increase. In some embodiments, optical tracking unit 23 may be replaced by a mechanical or opto-mechanical tracking unit, for example, using the same mechanisms as in trackball mouse or other mechanical mice.

Diameter sensor 24 may be attached to chamber 21 in order to detect diameter information related to the tool, for example, detecting which tool is inserted into tool chamber 21. Diameter sensor 24 may be included in chamber 21 or may be a separate component. Diameter sensor 21 may detect the diameter of tool 5 inside chamber 21 or outside chamber 21, for example, before entrance 100 or after exit 200. Diameter sensor 24 may be any sensor configured to detect a cross sectional diameter of a longitudinal rounded object. For example, sensor 24 may be a mechanical sensor or an optical sensor. An optical sensor may include a light source and a screen that detects the shadow of the tool on the screen and determines (by a processor, e.g., processor 62 illustrated in FIG. 5) the diameter of the tool based on the size of the shadow, the distance of the light source from the screen, etc. The accuracy of such detection method is determined by the resolution of the screen, the higher the resolution the higher the accuracy. Controller 40 may receive the determined diameter and may identify the type of the tool and may apply pre-stored data concerning the properties of the tool in the simulation, and further control force feedback unit 22 to apply force to tool 5, based on the determined diameter and the type of the tool.

In some embodiments, diameter sensor 24 and optical tracking unit 23 may be included in a single sensor (e.g., an optical sensor). The single sensor may be optically and/or mechanically configured to measure the translational and rotational movements of an operational tool and further to detect the diameter of the tool. The single sensor may be in communication with and/or controlled by controller 40. In some embodiments, working unit 20 may be designed such that both the translational and rotational movements and the diameter of the operational tool may be detected by a single sensor. An exemplary single sensor, according to some embodiments of the invention, may be a laser sensor based on Doppler Effect.

In some exemplary embodiments, working unit 20 may include a lever 25 to automatically move the operational tool towards an internal surface of tool chamber 21. Lever 25 may push the operational tool towards the surface, for example, the upper internal surface, of chamber 21, such that regardless of the tool's diameter, a portion of the outer surface of the tool may touch the internal surface of tool chamber 21 (see, FIG. 2C). If a portion of the outer surface of tool 5 touches the internal surface of tool chamber 21 at a location known to a sensor included in tracking unit 23, the sensor may track the movements of tool 5 regardless of the tool's diameter. The sensor may sense the movement of the outer surface touching the internal surface of tool chamber 21. The location of the sensor and tracking unit 23 may be fixed for every working unit 20 and the lever mechanism may allow using substantially identical tracking units for tracking movements of tools having different diameters. It is to be understood that lever 25 is only given as an example to a mechanism that may allow substantially identical tracking units to detect and track the movement of tools having different diameters and that the invention is not limited to the lever mechanism. Any other mechanism that may allow substantially identical tracking units to detect and track the movement of tool having different diameters may be used as well.

Working unit 20 may include one or more docking components 26 to dock the working unit to a docking station using "a plug and play" mechanism. As used herein, a "plug and play" mechanism refers to any docking or assembling mechanism that allows a user to assemble a system using few simple actions, for example, clamping, pushing, inserting, etc. A "plug and play" mechanism may allow a user to assemble a component to a system at at most: three actions, two actions or even at a single action. Docking components 26 may include any components such as pins, clamps, clips, fasteners and the like configured to easily assemble and disassemble a component in a system (e.g., a mechanical system).

In some embodiments, removable working unit 20 may be assembled at a medical simulation system that is not configured to be foldable. The unified nature of removable working unit 20 makes the working unit suitable to be assembled into any medical simulation system that requires detecting translational and rotational movements of a longitudinal operational tool and applying a force to the tool. Working unit 20 may address the need for a simple maintenance and easy replacement of spare parts either at foldable or non-foldable medical simulation systems. For a system to be able to utilize working unit 20 the system may have to include a base (either foldable or non-foldable) comprising docking station(s) for docking at least one removable working unit 20.

Figure 3A:
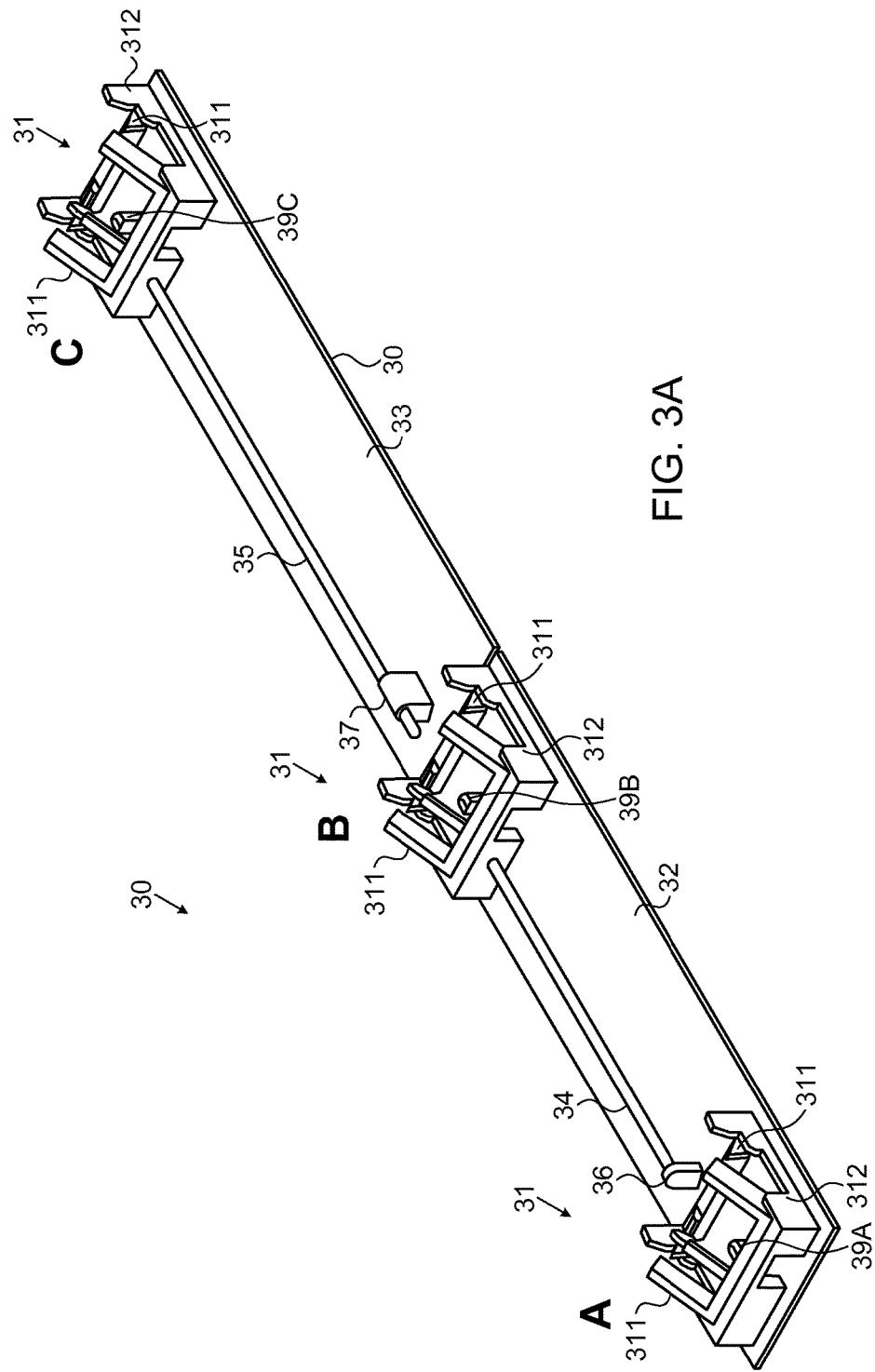
FIGS. 3A-3B are illustrations of an exemplary foldable base according to some embodiments of the invention.
Figure 3B:
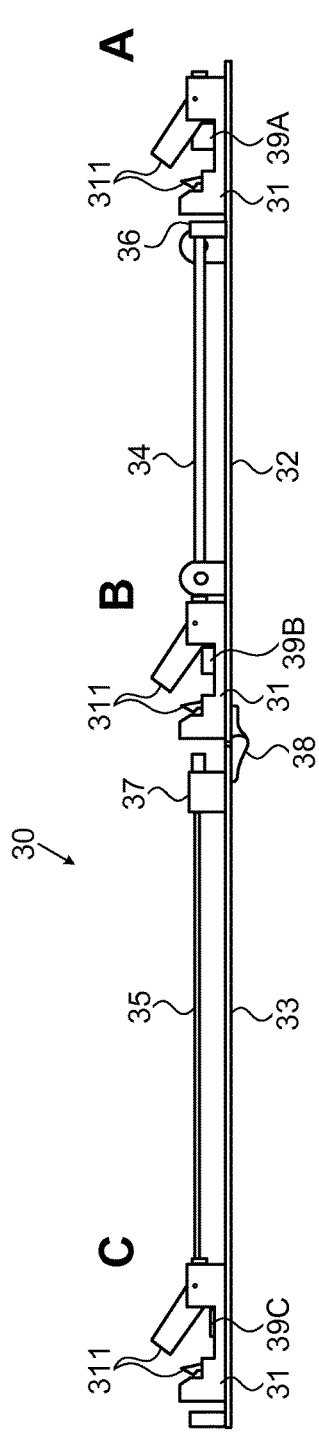

Reference is made to FIGS. 3A-3B that illustrate an exemplary foldable base according to some embodiments of the invention. FIG. 3A is an isometric view of the base and FIG. 3B is a front side view of the base. The exemplary foldable base, illustrated in FIGS. 3A-3B may be a detailed example for base 30 illustrated in FIG. 1. Foldable base 30 may include at least one docking station 31, for docking a working unit, for example working unit 20. Base 30 may further include at least two portions 32 and 33 connected by a hinged connector 38, each comprising guide tubes 34 or 35 mounted on bases 30 by supports 36 and 37 respectively. Base 30 may further include two or more adaptors 39 (e.g., adaptors 39A, 39B and 39C) for adapting various tool types having various diameters to the substantially identical removable working units 20. In some embodiments base 30 may include a single portion 32 and may not be foldable. All the different components (docking stations 31, guide tubes 34 and 35, supports 36 and 37 and adaptors 39A-39C) may be installed on the single portion base.

Exemplary docking station 31 may include one or more clamping elements 311 and frame 312 for docking working unit 20. Clamping elements 311 may be any element configured to lock, clamp, join, connect, etc. a component, such as working unit 20, in a system (e.g., a mechanical system) such as base 30. Clamping elements 311 may allow easy assembly and disassembly of working unit 20, using a "plug and play" mechanism. Camping elements 311 may include pins, clamps, clips, fasteners and others. Frame 312 may support working unit 20 when docked into docking station 31. The clamping mechanism of working unit 20 into docking station 31 may be vertical (as illustrated in FIG. 4), horizontal from any side of base 30 or in any other way that may allow easy assembly or disassembly of working unit 20 into docking station 31. Clamping element(s) 311 may include any element that may allow docking working unit 20 into docking station 31 vertically, horizontally or from any side of base 30.

In some embodiments, in order for a force feedback unit 22 to apply force to a tool inserted to unit 20 docked into stations 31, adaptor 39 may be located in docking station 31 at an opposite location to force feedback unit 22. Adaptor 39 may have a shape of a ramp for supporting tool 5 such that a normal (reaction) force is applied by adaptor 39 to the tool in response to a force applied to the tool by force feedback unit 22. Docking stations 31 may deviate from one to the other by the size of the adaptors. Different adaptors may be installed in different docking stations 31 for adopting different operational tools, for example adaptor 39A may be relatively short in order to accommodate a sheath having a diameter of about 4 mm, adaptor 39B may have intermediate height for accommodate a catheter having a diameter of about 1 mm and adaptor 39C may have the highest height in order to accommodate a guidewire having a diameter of about 0.14 mm. The difference in the heights of the different adaptors may be related to differences in the radiuses of the various operational tools.

In some embodiments, one or more force feedback units 22 and/or tracking units 23 may be assembled directly into foldable base 30, either by a "plug and play" mechanism or as a permanent component (e.g., a component that is not configured to be disassembled regularly). The foldable medical simulation system may include two or more force feedback units, for example, two or more force feedback units 22, each may be assembled to base 30, for example, at locations A, B, or C. The two or more force feedback units 22 may be identical or may be different, each designed to apply force to a different operational tool (e.g., a sheath, a catheter or a guidewire) or a different diameter range of tools. The medical simulation system may further include two or more tracking units, for example, tracking units 23 assembled in base 30 at locations A, B or C. The two or more tracking units 23 may be identical or may be different such that, each of the tracking units may be designed to detect the transitional and rotational movements of a different operational tool or a different diameter range of tools. In some embodiments, each one of the two portions 32 and 33 of the foldable base may include at least one tracking unit and at least one force feedback unit.

In some embodiments, medical simulation system 10 may include two or more force feedback units 22 permanently assembled into base 30 (e.g., at least one at each of portions 32 and 33, when the base is a foldable base). The force feedback units 22 may be assembled at positions A, B and/or C and may be similar or different. In those systems, tracking units 23 may be removable (e.g. assembled using "plug and play" mechanism) and substantially identical, such that each tracking unit 23 may be assembled at any of locations A, B or C. Similarly, some medical simulation systems may include two or more substantially identical removable diameter sensors 24 configured to be assembled at any of locations A, B or C. In some embodiments, system 10 may include two or more tracking units 23 permanently assembled into base 30 and the force feedback units 22 may be removable and assembled at positions A, B and/or C using a "plug and play" mechanism.

In some embodiments, the tracking units (e.g., tracking units 23) assembled into the foldable base may be self calibrated such that each unit may perform a self calibration routine in response to unfolding the system. The self calibrated tracking units may be included in a removable working unit, for example, removable working unit 20, or may be directly assembled into base 30. The self calibration may include, for example, determining for each optical tracking unit one or more calibration parameters, during the manufacturing process of the optical tracking unit and/or the manufacturing processes of the working unit including the tracking units and utilize the parameters during tracking operation. The calibration parameter(s) may be stored is a memory associated with the tracking unit or may be stored in a memory associated with the folded medical simulation system or in controller 40.

In some exemplary embodiments, the calibration parameters may be acquired using a designated calibrator and method. The calibrator may be controlled by a processor and may include a tool channel, a motorized tool having a known radios (e.g., a catheter), a motor controlled by a motor controller being in communication with the processor. The calibrator may manipulated the tool in movements and speed (backwards, forwards and rotation) having known values. The processor may receive the known values from the motor controller and may further compare the known values with values received from tracking units 23 and/or diameter sensor 24. The processor may calculate based on the comparison (using for example, an interpolate polynomial) a set of calibration parameters. This process may be conducted during the manufacturing of each working unit, for every tool diameter result in an array of calibration parameters comprising a plurality of parameter sets (for each tool diameter) to be stored in the memory associated with the working unit, for example, in memory 64 (see, FIG. 5). The calibration parameter may include parameters directed to calibrate tracking units 23 or diameter sensor 24 or both.

A calibration routine may be initiated upon unfolding the system, upon turning the system on, and during the assembly of the optical tracking unit or the removable working unit when the unit is not already installed in the foldable system and at any time during the operation of the medical simulation system. The calibration routine may calibrate the optical tracking units with respect to the unfolded base. The calibration routine may be executed, for example, by a controller, allowing the optical tracking unit to measure substantially accurate measurements of the transitional and rotational movements (i.e., tracking information) of any operational tool tracked by the optical tracking units. In some embodiments, mechanical or opto-mechanical tracking units may be assembled in medical simulation system 10 and the calibration routine may be preformed by the mechanical or opto-mechanical tracking units.

An exemplary calibration routine may include detecting the diameter of the tool using diameter sensor 24 and selecting a set of calibration parameters from the plurality of calibration parameter sets stored at memory 64, based on the detected diameter. The routine may further include applying the selected set of parameters to values measured by tracking unit 23. A processor 62 included in working unit 20 (see, FIG. 5) may correct the measured values using the calibration parameters and may send the corrected values to controller 40, to be used in the simulation. In some embodiments, the calibration parameters and the measured values may both be received by controller 40, and controller 40 may perform the calibration routine.

Foldable base portions 32 and 33 may each include a guide tube, for example guide tube 34 located on portion 32. Guide tubes 34 and 35 may guide the operational tool, along portion 32 and 33. In some embodiments, guide tube 34 may have a larger diameter than guide tube 35. Each guide tube may be supported by at least one support (36, 37) at one end and docking station 31A or 31B at the other end, as illustrated in FIGS. 3A and 3B. Each docking station may have a hole or an aperture allowing only the pre-defined range of tools to enter the station. The station at position A may have an aperture adapted for a sheath (or a tool of similar diameter), the station at position B may have an aperture configured to allow only the catheter (or a tool of similar diameter) to enter the station and the station at position C may have an aperture configured to allow only the guidewire to enter the station.

Figure 3C:
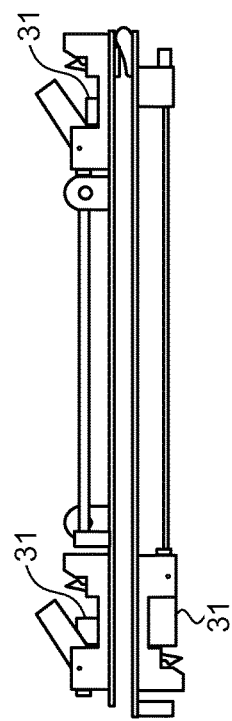
FIG. 3C is an illustration of an exemplary foldable base in a folded position according to some embodiments of the invention.

Connector 38 may include an axis or a hinge to allow portions 32 and 33 to be folded, thus may allow base 30 to be folded into a folded position, as illustrated in FIG. 3C. In some embodiments the total length of base 30 at the folded position may not exceed 55 cm, allowing the base to be packed in a suitcase. In some embodiments, portions 32 and 33 may be disconnected, such that each portion may be packed separately and connector 38 may include a mechanism for connecting and disconnecting portions 32 and 33.

In some embodiments, the system may include two separate pairs of foldable bases 30, for example as illustrated at FIG. 1. In some embodiments, the two foldable bases 30 are mechanically connected. However it should be understood by a person skilled in the art that the two bases do not need to be mechanically connected. The use of a double base system as discloses herein, may be designed to simulate an endovascular procedure that utilize two catheters simultaneously or where the tools are inserted to the body through more than one entry points, for example, when the blood blockage is at an intersection between two blood vessels.

In some embodiments, the foldable base may have a Y-shape (not illustrated). Y-shaped bases may include three portions, for example, Y-shaped bases may include one leg portion and two arms portions connected to the leg portion by, for example, a Y shape connector. For example, the three portions may be assembled parallel to each other. A Y-shaped adaptor may be assembled to the leg portion in one end and to two arms portions at the other two ends. The Y-shaped base may be foldable or may comprise a single base element having a Y-shape.

An exemplary Y-shaped medical simulation system may include 4 docking stations (e.g., docking station 31), two located on the leg portion of the base and two at the end of each of the arms portions. Four working units (e.g., units 20) may be assembled into the four docking stations. Two sheaths each comprising a catheter and a guidewire may be inserted into the first working unit at the leg portion, alternatively a single sheath comprising two catheters each including a guidewire may be inserted into the first working unit. Two catheters may be inserted into the second working station at the leg portion. Upon exiting from the second working unit the two catheters may split between the two branches by entering guide wires or catheters into each of the arms portion. At the end of each arm portion the guidewire located at each catheter may enter additional working units, according to some embodiments of the invention.

In some embodiments, the Y-shaped medical simulation system may not include removable working units and at least some components included in the working units may be assembled directly to the Y-shaped base, in a similar manner to the way disclosed above with respect to base 30. Similarly the controlling mechanism (e.g., controller 40) the sensing components (e.g., sensor diameter 24 and tracking unit 23) may be the same to the ones disclosed above and every description, method, component, element, portion, etc. that is disclosed with respect to a straight lined medical simulation system (e.g., system 10, unit 20 and base 30 illustrated in FIGS. 1-4) may be implement to a Y shaped medical simulation system, as well.

FIG. 4 is an illustration of an assembly of working units in a base according to some embodiments of the invention. Three working units 20 are shown at a docking position at docking stations 31, prior to the final docking. Units 20 may be docked or assembled into foldable base 30 using a "plug and play" mechanism. The units may be docked into stations 31 by attaching unit 20 to clamping element 311 and pushing down clamping element 311 to a docking position. As unit 20 is docked into docking station 31, all the components included in removable working unit 20 are located in the right positions.

Figure 5:
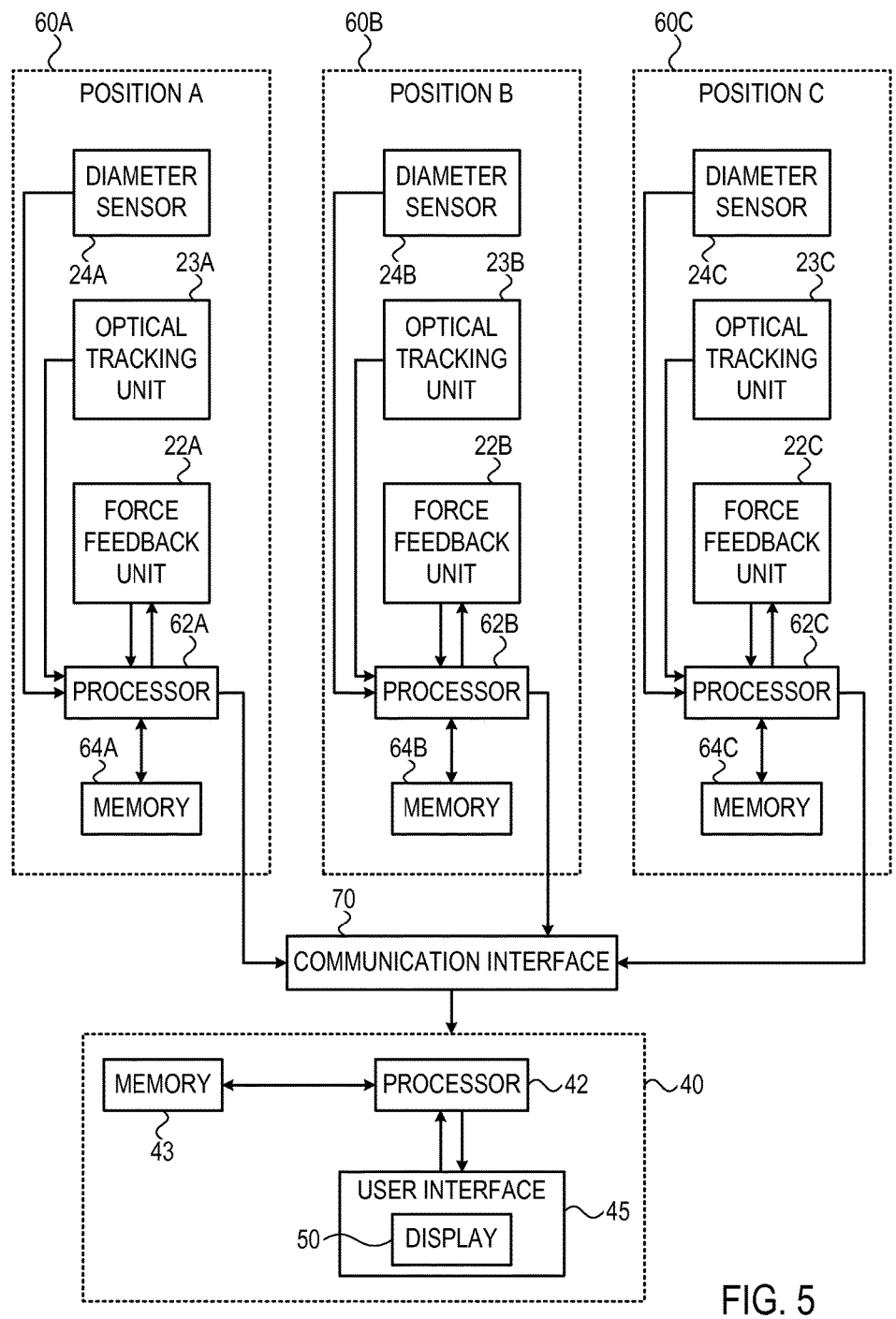
FIG. 5 is a high level block diagram of an exemplary simulation system according to some embodiments of the invention.

FIG. 5 is a high level block diagram of a system for simulating an image-guided medical procedure according to some embodiments of the invention. System 10 may include: a controller 40 and assemblies 60 for each of the three working stations (e.g., 60A, 60B and 60C) communicating with controller 40 via communication interface 70. Controller 40 may include processor 42 configured to execute instructions stored in memory 43 and communicate with a user via user interface 45. Memory 43 may store a software program for executing an image-guided medical procedure. Processor 42 may carry out the steps disclosed in method 700. Controller 40 may be a general purpose computer such as a personal computer, a laptop computer, a tablet, or any other type of computing platform. Processor 42 may be provisioned with, a CPU or microprocessor device and several I/O ports. Memory 43 may include a non-transitory storage medium that may store instructions to perform operations and/or methods, for example, various simulation programs for operational procedures to be simulated by system 10. User interface 45 may include any device configured to allow a user (e.g., a physician or trainer) to communicate (input and output) with controller 40, for example, user interface 45 may include: a keyboard, a mouse, speaker(s), a microphone and a display 50. Display 50 may include: a screen, a touch screen, three dimension (3D) goggles, a graphical user interface (GUI) or any other display.

Memory 43 may store instructions for performing a simulation of an image guided medical procedure. The instructions may include obtaining a three-dimensional (3D) medical image depicting an organ of a patient, producing a computerized 3D anatomical model of the organ according to the 3D medical image and simulating an image-guided procedure for the patient according to the 3D model. Instruction related to simulating an image-guided procedure may further include receiving inputs from sensors, for example, receiving tracking information related to the movements of the various operational tools from tracking units 22 and/or receiving information related to the type of the operational tool from diameter sensors 24. Processor 42 may use the received information to simulate a progress and the location of a simulated operational tool (and the type of the tool) inside the computerized anatomy. The processor may further display to the user a simulated image of the simulated operational tool inside the computerized anatomy, for example, following receiving an input that the user have used a contrasting fluid syringe and a feet pedal. The instructions may further include, periodically updating the location of each operational tool, and the identity of each tool in the simulation based on the information received from the sensors and further displaying to the user a simulated image of the new location upon a request (e.g., pressing the feet pedal).

Controller 40 may receive from the user via user interface 45 instructions to be executed by processor 42, for example, the user may select a type of an operational procedure (e.g., balloon angioplasty) and where in the arterial network is the blockage and the processor may determine the amount of force that the force feedback units may apply to the operational tools according to the user's selection. The controller may display to the user, on display 50, a simulated image (e.g., a simulated fluoroscopic image) of the location of the operational tool(s) inside the arterial network.

Assembly 60 at each working unit may include a processor 62 and a memory 64 being in communication with: force feedback unit 22, optical tracking unit 23 and diameter sensor 24. All assemblies 60 may be substantially identical. In some embodiments, a single processor 62 and/or a single memory 64 may be in communication with two or more of: force feedback units 22, optical tracking units 23 and/or diameter sensors 24 included, for example, in two or more working units. The single processor and/or single memory may be assembled in the base included in the system for simulating an image-guided medical procedure, for example, base 30. Processor 62 may be any computing platform that is configured to be installed on a working unit and/or a base. Memory 64 may be any non-transitory storage medium that may store instructions to be preformed by processor 62 and may further be configured to be installed on working unit 20 and/or base 30. Processor 62 may send instruction to force feedback unit 22 to apply the force determined by controller 40. Processor 62 may further receive tracking information from tracking unit 23 and diameter information from diameter sensor 24. Each of processors 62 located each at different positions A, B or C at system 10, either in working unit 20 or in base 30, may receive from the respective diameter sensor 24 the detected diameter of the tool inserted to the working unit at the respective position. Alternatively, processor 62 may receive the diameter information from a single sensor (e.g., an optical sensor) configured to detect both the diameter and the movements of the operational tool.

Each of processors 62 may send the received diameter information and tracking information to controller 40 (processor 42) to be used by any simulation software stored in memory 43. Controller 40 may display on display 50 a simulated image of a computerized anatomy that includes a simulated operational tool. The type of the simulated tool may be determined based on user interface 45 or the diameter information received sensor 24 via processor 62 and the location of the tool in the computerized anatomy may be determined based on the tracking information received from tracking unit 23 via processor 62.

Controller 40 may further determine the force to be applied by each of force feedback units 22, also according to the inputs received from each of processors 62 (or from single processor 62). For example, controller 40 may receive from processor 62 that the tool's diameter at position A is 4 mm. Controller 40 may determine based on the diameter detection that a sheath was inserted at position A. The controller may further receive data indicative of the transitional and rotational movements of the sheath indicating that the tool has been inserted into a blood vessel for additional 5 cm and may calculate a new location of the sheath in the arterial network. The controller may further determine what is the force that may be applied by force feedback unit 22 at position A to the sheath, based on: the new location of the sheath in the arterial network, the simulated procedure selected by the user and the manipulation of the operational tool performed by the user during the simulation that were detected by optical tracking unit 23 (or the single sensor) at position A.

Processors 62 may communicate with controller 40 (processor 42) via communication interface 70. Communication interface 70 may communicate with controller 40 by either wired or wireless communication. Communication interface 70 and may include any port for wired communication, for example, a USB port, an RJ LAN port or a serial port; or may include wireless communication components, for example, a WiFi antenna. Communication interface 70 may be installed in base 30 such that communication between processor(s) 62 and interface 70 may be established when each working unit 20 is docked into docking station 31. Working unit 20 and docking station 31 may include plugging components configured to establish a communication between the working stations and interface 70.

Figure 6:
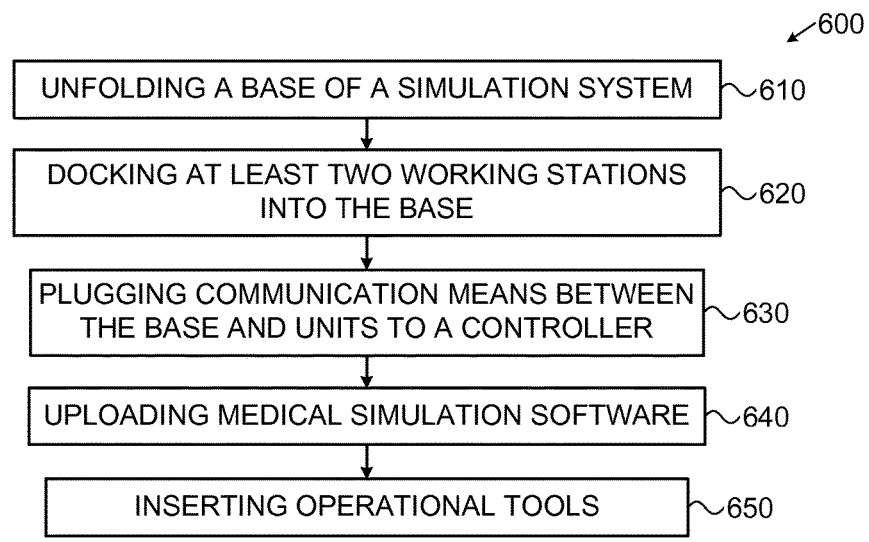
FIG. 6 is a flowchart diagram illustrating a method of assembling a portable foldable medical simulation system according to some embodiments of the invention.

Reference is made to FIG. 6 that illustrates a method for assembling an image guided medical simulation system according to some embodiments of the invention. A system, e.g., system 10, may be packed inside a suitcase or a box, such that each of the system's main components is packed separately. A base of the system (e.g., foldable base 30, Y shaped base or dual base) may be packed in an as folded position (see, FIG. 3C), such that the two portions of the base (e.g., portions 32 and 33) are back to back with each other, or separated from each other. In operation 610, the method may include, unfolding (or assembling) the base of the simulation system to an operational position. Alternatively, the base may be made from a single portion and may simply be taken out of its package to be in an operational position. In operation 620, the method may include docking at least two working units (e.g., working units 20) into the base using a "plug and play" mechanism. The working units may all be substantially identical and may include substantially identical components, such that any working unit may be assembled at any of positions A, B or C.

After assembling all the mechanical components (e.g., bases and working units), in operation 630, the method may include plugging the assembled mechanical system to a controller via communication interface 70. In operation 640, the method may include uploading, by a user, a simulation program stored in a memory associated with controller 40, e.g., memory 43. The user may further select an operational procedure from a plurality of operational procedure stored in the memory to be simulated by the medical simulation system.

In operation 650, the method includes inserting, by the user, the operational tool(s) (e.g., tools 5) into the portable and foldable medical simulation system. Upon inserting the tool(s) the image guided medical simulation procedure begins. For example, when three coaxial operational tools inserted one into the other, may be inserted into the first working station 20 docked into docking station 31 located at location A (as illustrated in FIGS. 1 and 3A-3B), the tracking unit and the diameter sensors at location A may start to send signals to controller 40 (via processor 62 and interface 70). Controller 40 may then, display to the user a simulated image of the operational tool and the organ (the computerized anatomy) in which the tool is being inserted, according to the simulated procedure selected by the user in operation 640. Controller 40 may control the force feedback unit included in the working unit, docked in position A, to apply force to the tool. The same methodology may be used when the other operational tools are inserted to positions B and C.

Figure 7:
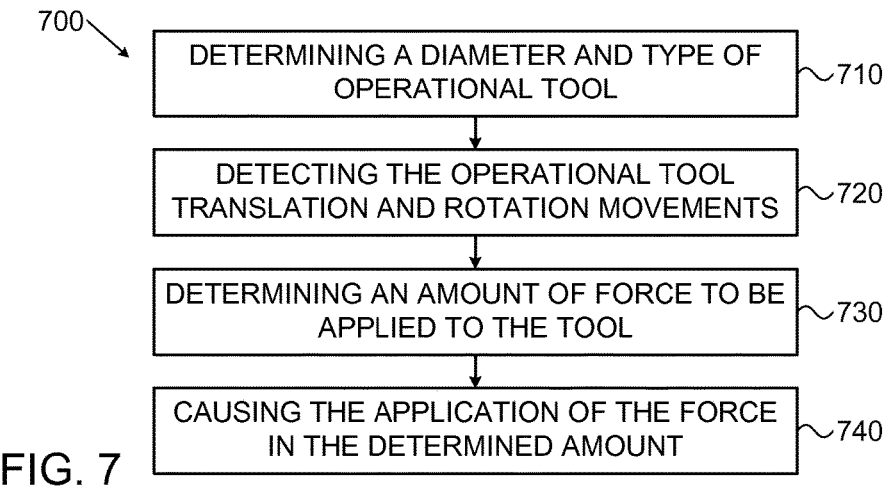
FIG. 7 is a flowchart diagram illustrating a method of controlling an exemplary foldable medical simulation system according to some embodiments of the invention.

Controller 40 may execute various methods for controlling the simulated image guided medical procedure, for example the method illustrated in FIG. 7. Instructions for executing method 700 may be stored in memory 43 to be executed by processor 42. The instructions may be stored in any other memory and/or be executed by any other processor. Controller 40 may be configured to receive information and control all the controllable components included in the system, for example, the components included in every working unit (e.g., unit 20) assembled into the base (e.g., base 30, Y base or dual base). In operation 710, the method may include detecting diameter information related to an operational tool inserted into a working unit, for example, by determining the type of the operational tool (e.g., sheath, catheter or guidewire) inserted at each working unit based on information received from sensors (e.g., sensors 24, or a single sensor configured to detect both the diameter and the movements of the operational tool).

In operation 720, the method may include detecting tracking information related to the operational tool, for example, by detecting translational and rotational movements of the operational tool inside the working unit. The controller may further receive tracking information regarding the translational and rotational movements of each of the operational tools inserted into each working unit from optical tracking units (or the single sensor configured to detect both the diameter and the movements of the operational tool) at each working unit. In operation 730, the method may include determining, for each working unit, an amount of force to be applied to the tool by a force feedback unit, based on the detected diameter information and the detected translational and rotational movements (i.e., the tracking information). The controller may determine the amount of force based on information related to the type of medical procedure selected by the user, the location of the operational tools in the computerized anatomy according to the selected medical procedure, the tracked movements of the tool and according to the type of the tool. The determined force that a particular force feedback unit may apply, may simulate the force that a human tissue, according to the simulation, would have been applied to the particular tool, for example, the force that a coronary artery would have been applied to a catheter. In operation 740, the method may include controlling the force feedback unit to apply the determined amount of force.

In some embodiments, method 700 may further include displaying a simulated image of the operational tool in the computerized anatomy during simulation of the image-guided medical procedure based on the diameter information and the tracking information. A simulated image may include the computerized anatomy, for example, a simulation of the arterial network and a simulated operational tool. The type of the tool to be simulated may be determined based on the diameter information received in operation 710 or from user interface 45 and the location of the tool in the computerized anatomy may be determined based on the tracking information received in operation 720.

Figure 8:
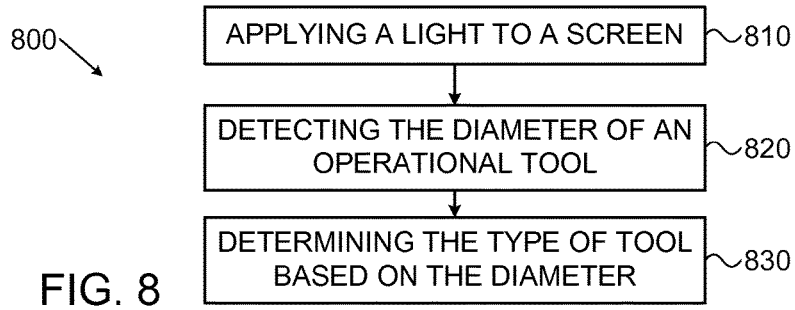
FIG. 8 is a flowchart diagram illustrating a method of determining a diameter of a tool according to some embodiments of the invention.

Reference is made to FIG. 8 that illustrates a method for determining the diameter and the type of an operational tool according to some embodiments of the invention. In operation 810, the method may include inserting an operational tool 5 (e.g., a sheath, a catheter or a guidewire) an into a diameter sensor included in a working unit. A light may be applied from a light source. The light source may have a substantially parallel beam (e.g., a laser bean) having a known diameter or a beam having a known opening angle. The light source may be located at a known distance from a light sensitive screen. The operational tool passing in the light beam (substantially perpendicular to the light beam) may apply a shadow on the screen. In operation 820, the method may include detecting the width of the shadow and determining the diameter of the tool by determining the length of the shadow. For example, for a parallel beam (or substantially parallel beam) the length of the shadow may be substantially identical to the diameter of the tool or proportional to the diameter of the operational tool. In operation 830, the method may include determining the type of tool inserted into the working station base on the detected diameter.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A computer-implemented method of controlling a system for simulating an image-guided medical procedure for different operational tools having different diameters comprising:

detecting, by at least one diameter sensor, diameter information related to an operational tool inserted into a working unit by a user;

determining, by a computer processor, a type of the operational tool based on the diameter information from the at least one diameter sensor;

detecting, by at least one tracking sensor, tracking information related to translational and rotational movements of the operational tool inserted into the working unit;

displaying, on the computer display, a simulated image of the operational tool in a computerized anatomy during simulation of the image-guided medical procedure based on the determined type of operational tool and the detected tracking information;

determining, by the computer processor, an amount of physical force to apply by a force feedback unit to the operational tool which simulates the force that a human tissue, according to the simulation, would have been applied to the operational tool based on the diameter information, the type of the operational tool, and the tracking information;

applying, by the computer processor, pre-stored data concerning the physical properties of the operational tool to the simulated image of the operational tool in the computerized anatomy during simulation of the image-guided medical procedure; and controlling, by the computer processor, the force feedback unit to apply the amount of physical force to the operational tool when the operational tool is manipulated by the user in the working unit.

2. The method of claim 1, wherein the tracking information is detected regardless of the detected diameter information when an outer surface of the operational tool touches an internal surface of a tool chamber.

3. The method of claim 2, further comprising automatically moving the operational tool towards the internal surface of the tool chamber.

4. The method of claim 2, further comprising detecting a movement of an outer surface of the operation tool touching the internal surface of the tool chamber.

5. The method of claim 1, wherein a type of medical procedure is selected by a user.

6. The method of claim 5, wherein determining the amount of physical force to apply by the force feedback unit is further based on information related to the selected type of medical procedure.

7. The method of claim 5, wherein the computerized anatomy simulates an organ in which the selected type of medical procedure would be performed.

8. The method of claim 1, wherein: determining the amount of physical force to apply by the force feedback unit is further based on a position of the operational tool, and tracking information detected at the position.

9. The method of claim 8, wherein the force feedback unit is controlled to apply the amount of physical force to the operational tool at the position.

* * * * *